March 17, 1931. J. V. ROBINSON 1,797,171
AUTOMATIC TRAIN PIPE CONNECTER
Original Filed Dec. 3, 1919 2 Sheets-Sheet 1

Patented Mar. 17, 1931

1,797,171

UNITED STATES PATENT OFFICE

JOSEPH V. ROBINSON, OF NEW YORK, N. Y.

AUTOMATIC TRAIN-PIPE CONNECTER

Application filed December 3, 1919, Serial No. 342,138. Renewed April 13, 1929.

My invention relates to automatic train pipe connecters and has among its objects, to provide an improved support therefor characterized by simplicity of design and construction and in which the minimum resistance to free universal movement of the coupling head of the connecter is presented. A further object of the invention is to provide an improved support for train pipe connecters which will prevent damage to the connecter when the coupling heads foul or jam in service.

My improvement consists of the combinations, arrangements and constructions described in the following specifications, pointed out in the annexed claims and illustrated in the accompanying drawings, in which—

Figure 1:
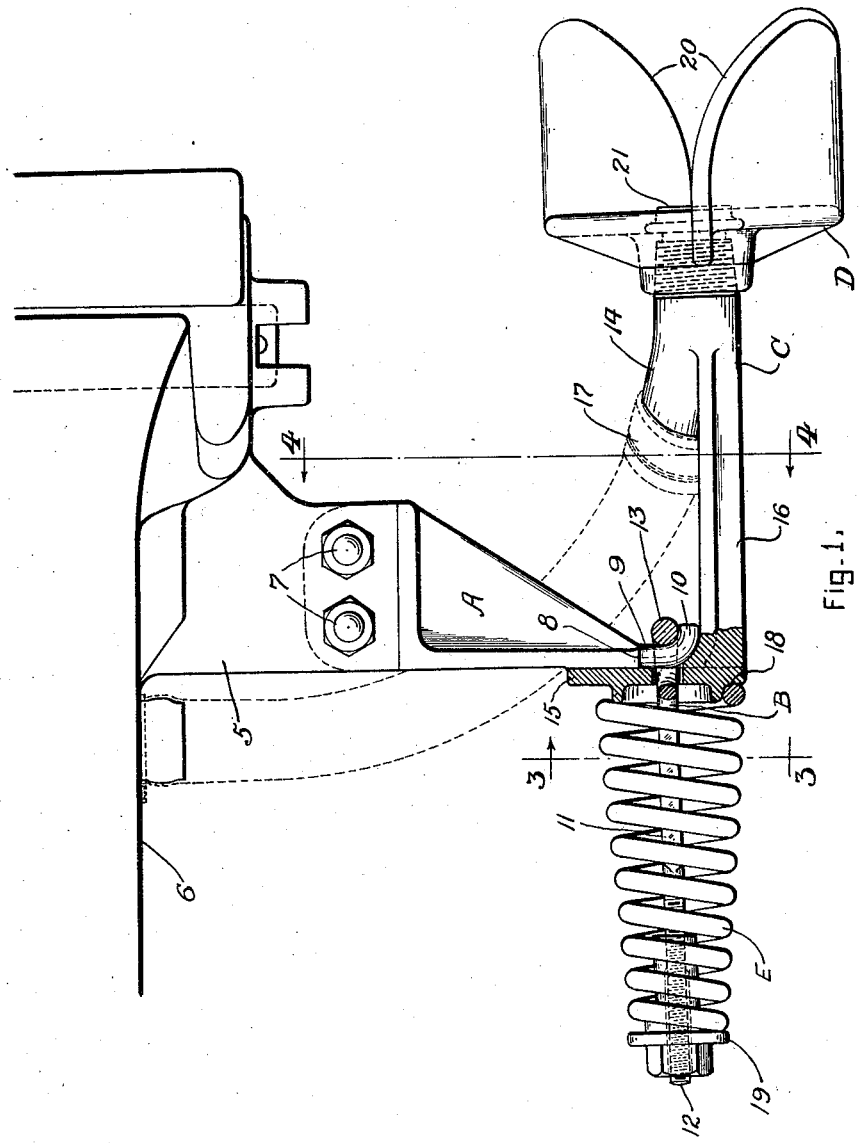
Figure 1 is a side elevation of my improved support showing a part thereof in section.
Figure 2:
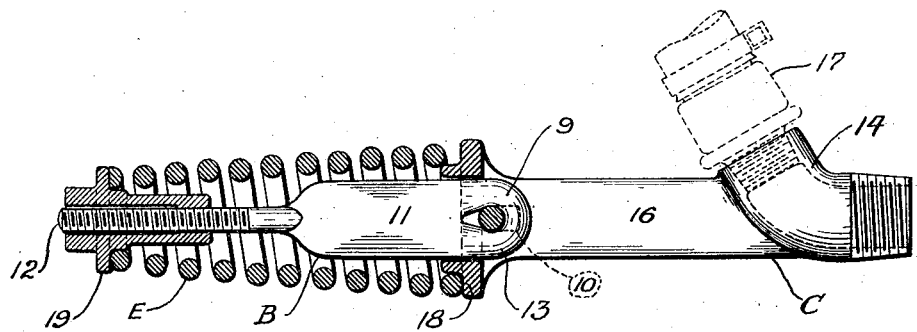
Figure 2 is a longitudinal sectional plane view of the structure shown in Figure 1 with the coupling head omitted.
Figures 3, 4:
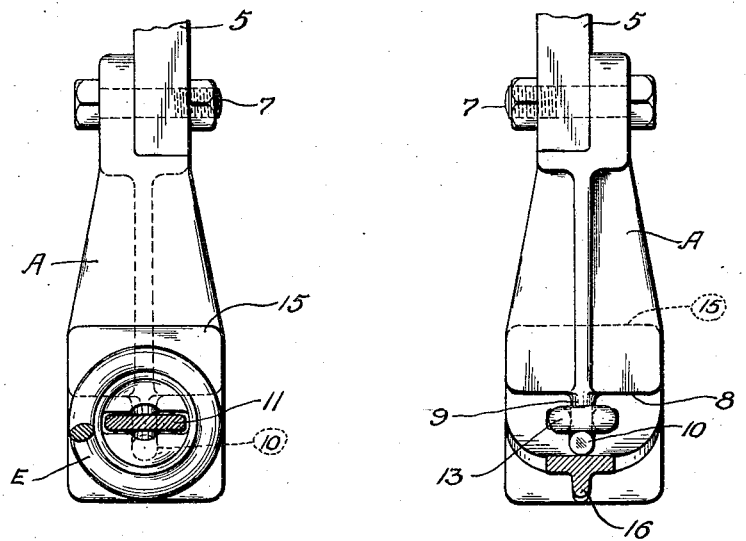
Figure 3 is a rear view of my improvement taken on the line 3—3 of Figure 1 with the coupling head omitted.
Figure 4 is a front view of my improvements taken on the line 4—4 of Figure 1.

Referring to the drawings: My improvement consists of a vertically extending bracket or base A suitably secured to a lug 5 of the car coupler 6 as by bolts 7. The lower end of the bracket has a wide bearing face 8 on its rear side, and terminates in a projection or device 9 located substantially on the vertical center line of the bracket A and below said bearing face. The projection is formed integrally with the bracket and is round in cross section though it may be made separate of the bracket and be of other shape than round in cross section. The lower end 10 of the projection is curved axially of the coupling head of the connecter to form a seat as shown. A pivot member or device B, having an elongated horizontally disposed flat body 11 which terminates at one end in a cylindrical, threaded portion 12 and at the other end in a perforated head 13, is mounted on said projection with its head 13 resting in said seat formed by the curved end 10 of the projection line. This construction produces what may be termed a universal joint comprising connected members the mating faces of which are flared in opposite directions and in different planes, one in the horizontal plane and the other in the vertical plane away from their point of contact.

A body member C is provided for the purpose of carrying the coupling head of the connecter and spacing it the proper distance in front of the bracket A. The body comprises the laterally diverging hollow conduit 14 and a vertically extending perforated flange or upturned portion 15 connected with the conduit by a strap or member 16 formed, preferably, integrally with the flange and conduit. The conduit 9 suitably carries at one end, as by threads, any desired construction of coupling head D, and connects at the other end with a standard hose section 17. The flange 15 normally rests against the rear side of the bracket A and has an annular seat 18 upon which the spring E is seated. The flange also has an elongated opening which closely receives the pivot member or device B and upon and along which member the flange slides in service, the flange and the member co-operating with the projection 9 to prevent undue rotation of the coupling head D.

Any suitable form of spring for extending the coupling head D may be used with my improvement but I preferably employ a conical spiral spring E. This I pass over the rear end of pivot member B or device and mount on the seat 18 and secure in place by the nut or abutment 19 which is adjustably mounted on the rear end of the member B and engages the rear end of the spring, as shown.

It will be observed that the projection 9 lies above the connecting member 16 of the body C; that the horizontal center line of the coupling head D is below that of said universal joint, and that the member 16 is curved, at its point of connection with the flange 15, in conformity to the outline of said projection and engages the projection 9 to prevent the tension of the spring E from throwing the coupling head upwardly above the horizontal center line thereof. Thus the flange 15 contacts with the bracket A above and below the longitudinal center line of the universal joint formed by the pivot device B and the projection 9, such contact being of greater extent above said center line than below it.

In operation the guiding prongs 20 of opposing coupling heads D bring the heads into alignment and the gaskets 21, mounted in each head, into proper register, the universal joint, formed by the member or device B and the projection 9, yielding to permit the heads to accommodate themselves to the inequalities of car heights and the curvature of the track. Further coupling movement of the cars will shift the flange 15 rearwardly along the member or device B against the tension of the spring E, and away from the bracket A. This releases the universal joint whereupon mated coupling heads float with the flange 15 slidably resting on the member or device B and co-operating therewith and with the projection 9 to maintain the heads in proper service relation to the bracket A. By this construction of support damage to the connecter, caused by fouling thereof in coupling, is eliminated inasmuch as the coupling heads may widely move in any direction without jamming or binding any of its parts. This important advantage is gained through the novel form of universal joint employed and by mounting the body C entirely outside of the bracket A.

Being aware that changes may be made within the spirit and scope of my invention I desire not to be limited to the exact construction disclosed.

What I claim as new and desire to secure by Letters Patent of the United States, is

1. In an automatic train pipe connecter, the combination of a coupling head, a member connected with said head and extending rearwardly thereof and having an upturned portion provided with a perforation, a pivot device having an opening in its end which end extends through the perforation of said upturned portion, a bracket having an elongated projection rigidly secured thereto which extends through the opening in the end of said pivot device and lies above said member, and a spring for extending said head with said upturned portion pressing against the rear side of said bracket.

2. In an automatic train pipe connecter, the combination of a coupling head, a member connected to said head and extending rearwardly of the head and provided with a portion having a perforation, a pivot device provided with an opening in its end which end extends through the perforation of said portion and lies above said member, a bracket having an elongated projection rigidly secured thereto which extends through the open end of said pivot device and contacts therewith, the contracting faces of said open end and said elongated projection being flared in opposite directions away from their point of contact and a spring for extending said head.

3. In an automatic train pipe connecter, the combination of a coupling head, a vertically extending bracket, a member extending rearwardly of said head and past said bracket on one side only thereof and terminating in a portion which constitutes a flange adapted normally to rest against the rear side of said bracket, a seat on said flange, a pivot device extending from the front of said flange to the rear thereof and having an opening in its front end, a vertically extending elongated projection at the lower end of said bracket and extending through the opening in the end of said pivot device, an abutment upon the rear end of said pivot device, and a spring confined between said abutment and said seat and surrounding said pivot device.

4. In an automatic train pipe connecter, the combination of a coupling head, a bracket, a pivot device pivotally connected with said bracket for permitting universal movement of said head, the longitudinal center line of said device being above the longitudinal center line of said coupling head, means connecting said head with said bracket, and a spring acting upon said means to extend said head.

5. In an automatic train pipe connecter, the combination of a coupling head, a bracket the lower end of which terminates in a projection disposed on substantially the vertical center line of said bracket, a vertically extending flange having an opening, a member connected to said head and extending rearwardly thereof under said projection and connected to the lower edge of said flange, a pivot device having a perforated end which projects in front of said flange and embraces the projection on said bracket, and a spring for resisting movement of said coupling head.

6. In an automatic train pipe connecter, the combination of a coupling head, a member connected with said head, and extending rearwardly thereof and terminating in an upturned portion having an opening therethrough, a bracket resting normally against said portion, a pivot device extending through the opening in said flange for maintaining said flange in position, said pivot device being connected with said bracket and fixed against axial movement relative thereto, also being proportioned to closely fit the opening in said upturned portion of said member whereby undue relative movement between said pivot device and said member is prevented.

7. In an automatic train pipe connecter, the combination of a coupling head, a member projecting rearwardly of said head and having at its rear end a flange provided with an opening, a pivot device extending through said opening and having at its rear end an abutment, a spring acting against said abutment and the rear side of said flange, a vertically extending bracket having a portion which projects through the opening in said pivot member in front of said flange, said bracket having a rear bearing face which lies substantially wholly above the longitudinal center line of said pivot device and normally contacts with said flange whereby said spring is compressed axially when said head is moved laterally or vertically from the normal uncoupled position, and means for maintaining said coupling head and said bracket in operative relation.

8. In an automatic train pipe connecter, the combination of a coupling head, a member extending rearwardly of said head and carrying an upwardly turned projection having an opening therethrough, a bracket adapted to contact with said projection and having a bearing, the contact between said bracket and said projection being mainly above said bearing whereby said coupling head may move upwardly substantially free from the resistance of said spring but may not move laterally or downwardly free from such resistance, and means for maintaining said projection in position.

9. In an automatic train pipe connecter, the combination of a coupling head having a gasket adapted to mate with a complementary gasket in an opposing coupling head, a part suitably connected with said coupling head and having a member which extends rearwardly of said head and terminates in a vertically extending flange provided with an opening, a pivot device extending through said opening and with which said flange has sliding engagement, said device being provided with an opening in its front end, a vertically extending bracket terminating at its lower end in a projection located substantially on the vertical center line of said bracket and above said member, said projection being embraced by the open end of said pivot device to form a universal joint, said flange contacting with said bracket above and below the longitudinal center line of said pivot device, the contact between said flange and said bracket above said center line being of greater extent than the contact thereof below said line, a spring surrounding said pivot device and bearing upon said flange, an abutment adjustably carried by one end of said pivot device, to vary the tension of said spring against said flange, and means connecting said part with the train pipe of the car.

10. In an automatic train pipe connecter, the combination of a coupling head, a bracket, a projection bearing against the rear side of said bracket, means connecting said projection and said head, and a device pivotally connected with said bracket and upon which said projection is adapted to ride when said coupling head is shifted from the normal coupled position, said device operating also to support said projection against shifting in the vertical plane relative to said bracket.

11. In an automatic train pipe connecter, the combination of a coupling head, a bracket, a member connected to said head and extending rearwardly and having a flange engaging the rear face of said bracket, said flange being provided with an opening, a pivot rod extending through and closely fitting the opening in said flange, said bracket having a rigid vertically arranged projection at its lower end to which said rod is pivotally connected, and a coiled spring surrounding said rod and serving to hold said flange against the bracket.

12. In an automatic train pipe connecter, the combination of a coupling head, a bracket, a supporting member connected to said head and extending rearwardly beneath the lower end of said bracket, said member having at its rear end a portion arranged to bear against the rear side of the bracket, a tie rod pivotally engaging said bracket and extending rearwardly thereof, and a coiled spring carried by said rod and engaging said portion of said member.

13. In an automatic train pipe connecter, the combination of a coupling head, a bracket having the lower end thereof turned forwardly, a supporting member connected to said head and extending rearwardly beneath said curved portion of the bracket, said member having at its rear end a portion arranged to bear against the rear side of the bracket, a tie rod pivotally engaging said bracket and extending rearwardly thereof and a coiled spring carried by said rod and engaging said portion of said member.

14. In an automatic train pipe connecter, the combination of a coupling head, a bracket, a bar secured to said head and extending rearwardly beneath said bracket, said bar at its rear end having an upwardly extending perforated flange, a tie rod pivotally engaging said bracket and extending through and closely fitting said perforation and a coiled spring mounted on said tie rod and engaging said upwardly extending portion.

15. In an automatic train pipe connecter, the combination of a coupling head, a bracket having a portion at its lower end adapted to be engaged by a tie rod, a tie rod pivotally engaging said portion of the bracket and extending rearwardly thereof, a member connected to said head and extending rearwardly past said bracket, said member being arranged below the point of engagement between said tie rod and bracket, and a spring mounted on said tie rod and engaging said member.

In testimony whereof I hereby affix my signature.

JOSEPH V. ROBINSON.